(12) United States Patent
Johnson et al.

(10) Patent No.: US 11,519,502 B2
(45) Date of Patent: Dec. 6, 2022

(54) HYDRAULIC CONTROL SYSTEM AND METHOD

(71) Applicant: Caterpillar Inc., Peoria, IL (US)

(72) Inventors: Sean Johnson, Ratingen (DE); Marcus Bitter, Dortmund (DE); Sharath Cugati, Dortmund (DE)

(73) Assignee: Caterpillar Inc., Peoria, IL (US)

( * ) Notice: Subject to any disclaimer, the term of this patent is extended or adjusted under 35 U.S.C. 154(b) by 279 days.

(21) Appl. No.: 16/648,952

(22) PCT Filed: Sep. 5, 2018

(86) PCT No.: PCT/US2018/049566
§ 371 (c)(1),
(2) Date: Mar. 19, 2020

(87) PCT Pub. No.: WO2019/060136
PCT Pub. Date: Mar. 28, 2019

(65) Prior Publication Data
US 2020/0256354 A1    Aug. 13, 2020

(30) Foreign Application Priority Data

Sep. 22, 2017    (EP) .................................... 17192657

(51) Int. Cl.
*F16H 61/431*    (2010.01)
(52) U.S. Cl.
CPC .................................. *F16H 61/431* (2013.01)
(58) Field of Classification Search
CPC ............................... F16H 61/47; F16H 61/431
See application file for complete search history.

(56) References Cited

U.S. PATENT DOCUMENTS

| | | | | |
|---|---|---|---|---|
| 3,775,980 A | * | 12/1973 | Spirdco | F16H 61/47 60/462 |
| 7,686,737 B2 | * | 3/2010 | Nishi | B60W 10/06 477/68 |

(Continued)

FOREIGN PATENT DOCUMENTS

| | | |
|---|---|---|
| EP | 0076485 A1 | 4/1983 |
| JP | 4475301 82 | 6/2010 |
| WO | WO 2014/157902 | 10/2014 |

OTHER PUBLICATIONS

International Search Report for related International Application No. PCT/US2018/049566; report dated Nov. 29, 2018.

(Continued)

*Primary Examiner* — Thomas E Lazo
*Assistant Examiner* — Daniel S Collins

(57) ABSTRACT

A closed-loop hydraulic circuit associated with a swing mechanism of a machine is controlled to obtain both a pressure control during acceleration and deceleration of the swing mechanism and a velocity control during coasting. In this manner, a system pressure in closed-loop hydraulic circuit is maintained below a maximum allowable pressure during acceleration and deceleration, and the swing mechanism can be rotated at a desired constant speed during coasting. This is achieved by controlling a hydraulic actuator adjusting the displacement of a variable displacement pump in different control modes, depending on a comparison between a desired displacement of the pump and an actual displacement of the same.

14 Claims, 5 Drawing Sheets

(56) References Cited

U.S. PATENT DOCUMENTS

| | | |
|---|---|---|
| 7,934,329 B2 | 5/2011 | Mintah et al. |
| 8,020,659 B2 * | 9/2011 | Schultz .................. B60W 50/02 |
| | | 701/1 |
| 8,738,239 B2 | 5/2014 | Kang et al. |
| 9,315,968 B2 | 4/2016 | Shang et al. |
| 9,441,346 B2 | 9/2016 | Imaizumi et al. |
| 9,447,562 B2 | 9/2016 | Takaura et al. |
| 9,464,410 B2 | 10/2016 | Johnsen et al. |
| 9,469,968 B2 | 10/2016 | Park |
| 9,506,221 B2 | 11/2016 | Knuth et al. |
| 2017/0009784 A1 | 1/2017 | Llc |

OTHER PUBLICATIONS

European Search Report for related U.S. Appl. No. 17/192,657; dated Mar. 13, 2018.

* cited by examiner

HYDRAULIC CONTROL SYSTEM AND METHOD

CROSS-REFERENCE TO RELATED APPLICATION

This Application is a 35 USC § 371 US National Stage filing of International Application No. PCT/US2018/049566 filed on Sep. 5, 2018 which claims priority under the Paris Convention to European Patent Application No, 17192657.8 filed on Sep. 22, 2017.

TECHNICAL FIELD

The present disclosure generally relates to a hydraulic control system and method, in particular, to a closed-loop swing control for a hydraulic machine.

BACKGROUND

Hydraulic machines, for example, hydraulic excavators, use engines to drive hydraulic pumps, which in turn provide hydraulic power to a plurality of hydraulic circuits of the hydraulic machines. Each hydraulic circuit may include one or more actuators, for example, hydraulic cylinders and/or hydraulic motors. The plurality of hydraulic actuators each may require a flow of hydraulic fluid from one or more hydraulic pumps to operate the associated hydraulic cylinders or hydraulic motors. The amount of flow required by each hydraulic actuator may vary depending on an operator input. The hydraulic pumps may be controlled to supply the hydraulic system with the hydraulic flow required by each of the plurality of hydraulic actuators.

In some systems, the plurality of hydraulic circuits include a closed-loop hydraulic circuit. The closed-loop hydraulic circuit may include one or more hydraulic motors supplied with the required flow by one or more variable displacement pumps disposed in the closed-loop hydraulic circuit. Various control systems have been implemented to control the variable displacement pumps in the closed-loop hydraulic circuit.

The disclosed systems and methods are directed at least in part to improving known systems.

SUMMARY OF THE DISCLOSURE

In one aspect, the present disclosure relates to a hydraulic control system for a machine. The hydraulic control system comprises a closed-loop hydraulic circuit including a hydraulic motor and at least one variable displacement pump configured to supply the at least one hydraulic motor with pressurized hydraulic fluid. The hydraulic motor is configured to rotate a swing mechanism of the machine. The hydraulic control system further comprises at least one actuator configured to adjust the displacement of the at least one variable displacement pump, and a control unit. The control unit is configured to receive a first input indicative of a desired displacement of the at least one variable displacement pump, receive a second input indicative of an actual displacement of the at least one variable displacement pump, and control the at least one actuator to adjust the displacement of the at least one variable displacement pump in a first control mode when the actual displacement does not match the desired displacement, and in a second control mode when the actual displacement matches the desired displacement.

In another aspect of the present disclosure, a machine comprises an engine and the hydraulic control system of the above aspect of the disclosure. The at least one variable displacement pump is configured to be powered by the engine.

In yet another aspect of the present disclosure, a method of controlling a swing mechanism of a machine comprising a closed-loop hydraulic circuit including a hydraulic motor, at least one variable displacement pump configured to supply the at least one hydraulic motor with pressurized hydraulic fluid to rotate the swing mechanism, and at least one actuator configured to adjust the displacement of the at least one variable displacement pump comprises receiving a first input indicative of a desired displacement of the at least one variable displacement pump, receiving a second input indicative of an actual displacement of the at least one variable displacement pump, and controlling the at least one actuator to adjust the displacement of the at least one variable displacement pump in a first control mode when the actual displacement does not match the desired displacement, and in a second control mode when the actual displacement matches the desired displacement.

Other features and aspects of the present disclosure will be apparent from the following description and the accompanying drawings.

DETAILED DESCRIPTION

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as a limiting description of the scope of protection. Rather, the scope of protection shall be defined by the appended claims.

The present disclosure is based in part on the realization that in a known swing system of a hydraulic excavator, a torque-based control of the swing system is performed. In this control, a lever position of a control lever operated by an operator of the excavator corresponds to a constant torque that is applied to the swing motors of the swing system. Accordingly, the resulting control is not velocity-based, i.e., the swing mechanism cannot be controlled to rotate at a desired constant speed. Further, the control does not result in an automatic stop of the swing system when the lever is returned to the neutral position. Therefore, it has been realized that there is a need for a solution that allows for a velocity-based control, preferably in combination with a torque-based control.

The present disclosure is also based in part on the realization that, in a known control system for the swing system of a hydraulic excavator, additional hardware is needed to allow for a pressure control of the closed-loop swing system. In one known solution, an additional balance valve is provided, which balance valve is associated with significant costs. Further, failure mitigation of the additional hardware is complex. Therefore, it would be preferable to have a solution in which the additional hardware is no longer necessary, and the pressure control can be achieved in a different manner.

In accordance with the present disclosure, it has been realized that a velocity-based control of the swing system, together with additional features such as a pressure control and breaking energy recuperation, can be achieved by providing an intelligent mode manager implemented in software in order to switch between different control modes depending on whether the swing mechanism is accelerated/decelerated or coasting/stopped. Due to the implementation in software, the functionality of the additional valve that was previously used to perform the pressure control can be modelled in the software, and the valve can be omitted. This results in reduced costs and maintenance work.

Figure 1:
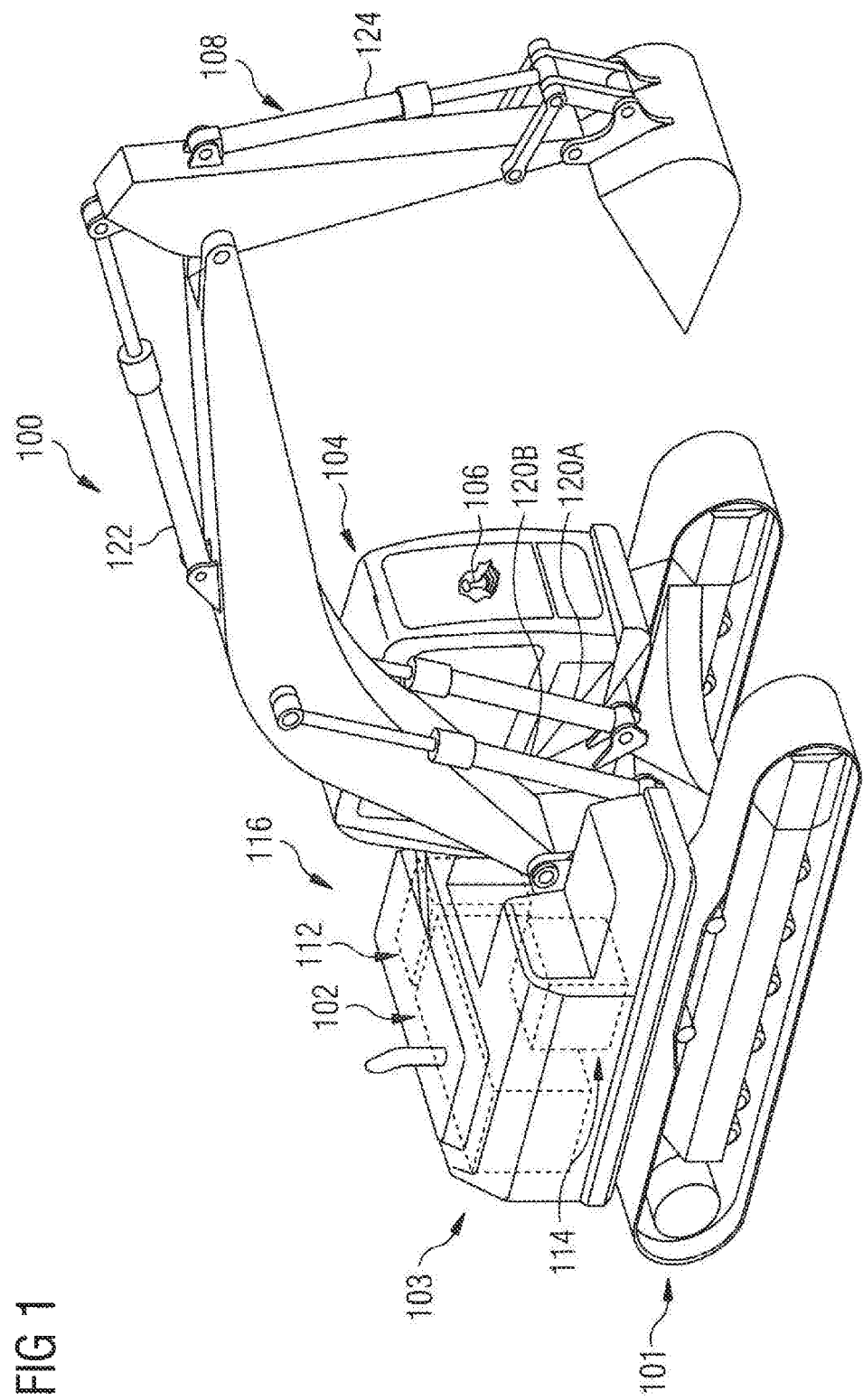
FIG. 1 is a schematic illustration of a machine in accordance with an exemplary embodiment of the present disclosure.

Referring now to the drawings, an exemplary embodiment of a machine 100 is schematically shown in FIG. 1. Machine 100 may be a hydraulic excavator, for example, a large mining excavator, or any other work machine that includes a hydraulic system with a closed-loop hydraulic circuit. Machine 100 includes an engine 102. Engine 102 provides power for machine 100 and its various components. Suitable engines may include gasoline powered engines, diesel powered engines, electrically powered engines or any combination of different types of engines. In one embodiment, engine 102 is a diesel engine that generates and transfer power to other components of machine 100 through a power transfer mechanism, for example, a shaft or gearbox (not shown). Engine 102 produces a mechanical power output that is converted to hydraulic power, for example, by one or more pumps powered by engine 102.

Machine 100 further includes an operator station or cab 104 containing controls for operating machine 100, for example, an input device 106. Cab 104 is part of a superstructure 103 rotatably mounted on an undercarriage 101 of machine 100. Input device 106 may be embodied as one or more joysticks, levers, buttons, and the like and is operatively connected to a hydraulic system 108 of machine 100.

Hydraulic system 108 includes fluid components such as, for example, hydraulic actuators or cylinders, tanks, valves, accumulators, orifices and other suitable components for producing a pressurized flow of hydraulic fluid. Hydraulic system 108 further comprises fluid sources, for example, one or more tanks and/or a reservoir 112, and one or more hydraulic pumps, which may include variable displacement pumps, fixed displacement pumps, variable delivery pumps or other suitable pressurizing systems. The hydraulic pumps may be drivably connected to engine 102, or may be indirectly connected to engine 102 via a gear mechanism or the like. It is also contemplated that hydraulic system 108 may include multiple sources of pressurized fluid interconnected to provide hydraulic fluid for hydraulic system 108.

Hydraulic system 108 may include a plurality of hydraulic actuators, for example, hydraulic actuators 120A, 120B for operating a boom of machine 100, a hydraulic actuator 122 for operating a stick of machine 100, a hydraulic actuator 124 for operating a bucket of machine 100, one or more hydraulic motors, for example, a hydraulic motor 130 (see FIG. 2) for operating a swing mechanism 105 (see FIG. 2) of machine 100, and hydraulic motors associated with a left propel drive and a right propel drive of machine 100. Swing mechanism 105 may be operable to rotate superstructure 103 with respect to undercarriage 101 of machine 100. It should be appreciated that in other embodiments different numbers of hydraulic motors and/or hydraulic actuators may be provided for the different hydraulic circuits.

Hydraulic system 108 further includes a hydraulic control system 116 for operating hydraulic motor 130, which will be described in more detail below.

Machine 100 also includes a control unit 114 suitable for controlling hydraulic system 108 and other components of machine 100, for example, hydraulic control system 116. Control unit 114 may be operatively connected to input device 106 and may be adapted to receive an input from an operator indicative of a desired movement (or a desired velocity) of machine 100 or an implement of machine 100, for example, swing mechanism 105 of machine 100, and thus may determine a power demand associated with each hydraulic actuator or motor of hydraulic system 108 for performing the desired movements.

Control unit 114 may include one or more control modules (for example, ECMs, ECUs, etc.). The one or more control modules may include processing units, a memory, sensor interfaces and/or control interfaces for receiving and transmitting signals. The processing units may represent one or more logic and/or processing components used by the system according to the present disclosure to perform various communications, control and/or diagnostic functions. The one or more control modules may communicate with each other and with other components within and interfacing control unit 114 using any appropriate communication mechanisms, for example, a CAN bus.

Further, the processing units may be adapted to execute instructions, for example, from a storage device such as a memory. The one or more control modules may each be responsible for executing software code for hydraulic control system 116 and/or other components of machine 100. The processing units may include, for example, one or more general purpose processing units and/or special purpose units (for example, ASICs, FPGAs, etc.). In some embodiments, the functionality of the processing units may be embodied in an integrated microprocessor or microcontroller, including an integrated CPU, a memory, and one or more peripherals.

Figure 2:
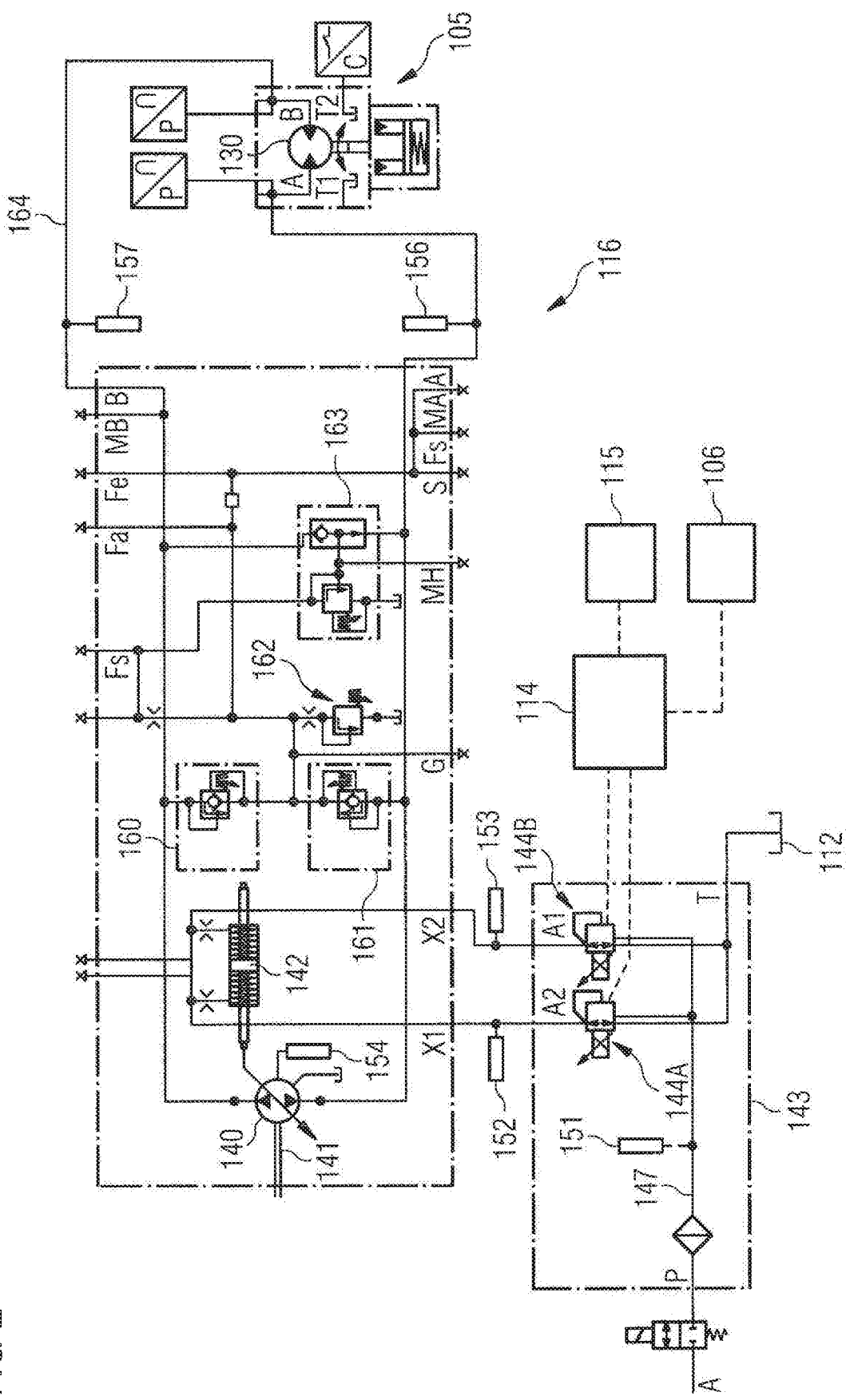
FIG. 2 schematically illustrates a hydraulic control system in accordance with an exemplary embodiment of the present disclosure.

Referring now to FIG. 2, an exemplary embodiment of hydraulic control system 116 for controlling swing mechanism 105 of machine 100 is shown. In the exemplary embodiment shown in FIG. 2, hydraulic control system 116 includes a closed-loop hydraulic circuit 164.

Hydraulic circuit 164 includes hydraulic motor 130 configured to drive swing mechanism 105 of machine 100 to rotate counterclockwise (left) or clockwise (right). Hydraulic motor 130 is configured in a known manner to receive hydraulic fluid to effect swinging of superstructure 103 (see FIG. 1) about a vertical axis of machine 100.

Hydraulic circuit 164 further includes at least one variable displacement pump 140. Variable displacement pump 140 is fluidly connected to hydraulic motor 130 in closed-loop hydraulic circuit 164 to supply pressurized hydraulic fluid to hydraulic motor 130. Variable displacement pump 140 may be embodied as a variable displacement axial piston pump, and hydraulic motor 130 may be embodied as a fixed displacement hydraulic motor or a variable displacement hydraulic motor. The speed and torque of hydraulic motor 130 is controlled by adjusting an angle of inclination of a swash plate (not shown) of variable displacement pump 140. A swash plate angle for variable displacement pump 140 may be either positive or negative, corresponding to a flow of hydraulic fluid either counterclockwise or clockwise in closed-loop hydraulic circuit 164. Accordingly, hydraulic motor 130 may be operated by variable displacement pump 140 to swing superstructure 103 of machine 100 either counterclockwise (swing left) or clockwise (swing right). The swash plate angle of variable displacement pump 140 may be controlled by a hydraulic actuator 142, which will be described in more detail in the following.

Hydraulic actuator 142 is configured to receive pressurized fluid having a pilot pressure that corresponds to a desired displacement of the associated variable displacement pump 140 from a pilot valve assembly 143. In the exemplary embodiment shown in FIG. 2, pilot valve assembly 143 comprises a first pilot valve 144A and a second pilot valve 144B. Pilot valves 144A, 144B may be, for example, electrohydraulic pressure reducing valves or similar valves for generating the pilot pressure. Pilot valves 144A, 144B may be configured to receive pressurized hydraulic fluid from a reservoir 112 via a pilot pump (not shown) and a hydraulic line 147.

Hydraulic actuator 142 is configured in a known manner to adjust the displacement of variable displacement pump 140 by receiving pressurized fluid from pilot valve assembly 143. One side of hydraulic actuator 142 is fluidly connected to first pilot valve 144A via an input X1, and the opposite side of hydraulic actuator 142 is fluidly connected to second pilot valve 144B via an input X2. A pressure difference between the two sides of hydraulic actuator 142 results in a movement of a piston of the same, which in turn results in an adjustment of the angle of the swash plate of the associated variable displacement pump 140. In case of no pressure difference between the two sides, variable displacement pump 140 may be in the neutral position, where hydraulic motor 130 is not driven by variable displacement pump 140. By supplying hydraulic fluid having a desired pilot pressure to one side of hydraulic actuator 142 via one of inputs X1 and X2, variable displacement pump 140 may drive hydraulic motor 130 with a desired working pressure of the hydraulic fluid in closed-loop hydraulic circuit 164. The desired working pressure may be derived from a control signal generated by actuation of input device 106 (see FIG. 1) by an operator of machine 100. Control unit 114 is operatively connected with input device 106 and pilot valves 144A, 144B via communication lines. Control unit 114 generates a control signal for pilot valves 144A, 144B, which results in an appropriate pilot pressure being generated by pilot valves 144A, 144B and being received by hydraulic actuator 142 to cause variable displacement pump 140 to drive hydraulic motor 130 to rotate superstructure 103 of machine 100 with a desired velocity.

Hydraulic circuit 164 further includes a plurality of sensors, namely, a pilot supply pressure sensor 151 configured to detect a pressure of the hydraulic fluid that is supplied to the first pilot valve 144A and second pilot valve 144B, a pair of pilot pressure sensors 152, 153 configured to detect the pressure of the fluid supplied to first input X1 and second input X2 of hydraulic actuator 142, a pair of system pressure sensors 156, 157 configured to detect the system pressure in closed-loop hydraulic circuit 164 upstream and downstream of variable displacement pump 140, and a pump displacement sensor 154 configured to detect an actual (current) displacement of variable displacement pump 140. Control unit 114 is configured to control pilot valves 144A, 144B based at least in part on detection results from one or more of pilot supply pressure sensor 151, pilot pressure sensors 152, 153, system pressure sensors 156, 157, and pump displacement sensor 154. This will be described in more detail below.

Hydraulic circuit 164 further includes a pair of pressure relief valves 160, 161, a flushing valve 162, and a load resolver 163. Further, different parts of hydraulic circuit 164 may be connected to other components of the hydraulic system of machine 100 via a plurality of inputs/outputs, as indicated in FIG. 2. However, these components and inputs/outputs function in a known manner and are not essential to the control disclosed herein, such that a corresponding description will be omitted. It will also be appreciated that in some embodiments one or more of these components, for example, flushing valve 162, load resolver 163 etc., and inputs/outputs may be omitted or have a configuration that is different from the configuration shown in FIG. 2.

As shown in FIG. 2, control unit 114 is operatively connected to the pair of pilot valves 144A, 144B, and configured to control the same based on an input received from the operator of machine 100 via input device 106, and one or more of pressure sensors 151, 152, 153, 156, 157 and pump displacement sensor 154. In this control, which will be described in detail below, control unit 114 may use one or more maps that are stored in a memory 115 associated with control unit 114.

Generally, control unit 114 is configured to receive a first input indicative of a desired displacement of variable displacement pump 140, for example, from input device 106. Here, it will be appreciated that control unit 114 can be configured to determine the desired displacement on the basis of the position/operation amount of input device 106 in any appropriate manner. For example, a map could be used that relates the operation amount of input device 106 directly to a desired displacement of variable displacement pump 140. In other embodiments, the operation amount of input device 106 may correspond to a target speed of swing mechanism 105, and the desired displacement may be calculated based on a velocity modulation map relating the target speed to the desired displacement.

Control unit 114 is further configured to receive a second input indicative of an actual displacement of variable displacement pump 140, for example, from pump displacement sensor 154. It will be appreciated that, in other embodiments, any appropriate input quantity from which the actual displacement of variable displacement pump 140 can be determined can be used. For example, the actual displacement may be calculated on the basis of the position of hydraulic actuator 142 and the pilot pressure detected by pilot pressure sensors 152, 153, the speed of hydraulic motor 130, etc.

Based on the received inputs, control unit 114 is configured to control hydraulic actuator 142 to adjust the displacement of variable displacement pump 140. According to the present disclosure, control unit 114 compares the desired displacement of variable displacement pump 140 to the actual displacement of the same, and uses different control modes depending on the result of the comparison. In particular, in a first control mode, when the actual displacement does not match the desired displacement, for example, differs from the same by more than a predetermined amount, control unit 114 performs a pressure control, which will be described in more detail below, and in a second control mode, when the actual displacement matches the desired displacement, control unit 114 performs a velocity control, which will also be described in more detail below. In the first control mode, control unit 114 controls hydraulic actuator 142 such that a system pressure in closed-loop hydraulic circuit 164 does not exceed a maximum desired system pressure. The maximum desired system pressure is set at least in part on the basis of the absolute value of the desired speed of swing mechanism 105. For example, a first map relating the maximum desired system pressure to the absolute value of the desired speed of swing mechanism 105 may be used in case swing mechanism 105 is accelerated, and a second map relating the maximum desired system pressure to the absolute value of the desired speed of swing mechanism 105 may be used in case swing mechanism 105 is decelerated. These maps may also be stored in memory 115 and accessed by control unit 114.

Control unit 114 is further configured to limit a rate at which hydraulic actuator 142 adjusts the displacement of variable displacement pump 140 based at least in part on the maximum desired system pressure. In particular, control unit 114 may limit the rate at which pressurized fluid is supplied to hydraulic actuator 142 by controlling pilot valves 144A, 144B in an appropriate manner. This will also be described in more detail below.

The second control mode is a mode in which control unit 114 controls hydraulic actuator 142 such that the displacement of variable displacement pump 140 is maintained at the desired displacement to rotate swing mechanism 105 with substantially constant speed, for example, during coasting of the same. A similar control is performed when swing mechanism 105 has been stopped.

As previously mentioned, control unit 114 may be configured to switch from the first control mode to the second control mode when the difference between the actual displacement and the desired displacement becomes less than a predetermined threshold. For example, the threshold may be set as 1% to 10%, preferably 5%, of the desired displacement. Of course, the set threshold may also be adjusted by an operator via an appropriate interface, if desired. In some embodiments, the threshold may be automatically set/adjusted based at least in part on the operation amount of input device 106. For example, when the difference between the desired displacement and the actual displacement becomes less than 5% of the desired displacement, control unit 114 may switch to the second control mode to rotate swing mechanism 105 with substantially constant speed. Here, it will be appreciated that the first control mode includes an acceleration mode, in which swing mechanism 105 is accelerated, and a deceleration mode, in which swing mechanism 105 is decelerated. According to the present disclosure, the control performed by control unit 114 in the acceleration mode and the deceleration mode may be different, as will be described below. Further, as previously mentioned, the second control mode may include a stop mode, in which swing mechanism 105 is stopped, and a coast mode, in which swing mechanism 105 rotates at substantially constant speed. Accordingly, in accordance with the present disclosure, four different control modes can be distinguished.

It will be appreciated that the switch between the first and second control modes does not necessarily have to be based on a direct comparison of the actual and desired displacements of variable displacement pump 140, but may also be determined by comparing different quantities associated with these displacements, for example, an actual speed of hydraulic motor 130 or swing mechanism 105 and a desired speed determined from the operator input.

While hydraulic control system 116 has been described as including hydraulic actuator 142, it will be appreciated that, in other embodiments, a different actuator could be used to adjust the displacement of variable displacement pump 140. For example, a solenoid could be used to actuate the corresponding actuator. This solenoid could be controlled by control unit 114 using the different control modes disclosed herein, with appropriate modifications. In this case, for example, instead of controlling pilot valves 144A, 144B to limit the system pressure, control unit 114 could operate the solenoid in the appropriate manner to adjust the actual displacement of variable displacement pump 140 in the various control modes described above, i.e. during acceleration, deceleration coasting and stopping of swing mechanism 105.

While hydraulic control system 116 has been described as being associated with swing mechanism 105 of machine 100, it is also contemplated that hydraulic control system may be used for other closed-loop hydraulic circuits, for example, hydraulic drive circuits for propelling machine 100 or similar machines.

INDUSTRIAL APPLICABILITY

The industrial applicability of the systems and methods for controlling a variable displacement pump in a closed-loop hydraulic circuit of a machine described herein will be readily appreciated from the foregoing discussion. One exemplary machine suited to the disclosure is a hydraulic excavator such as a large mining excavator. Similarly, the systems and methods described can be adapted to a large variety of machines and tasks.

In accordance with some embodiments, a method of controlling a swing mechanism of a machine comprising a closed-loop hydraulic circuit including a hydraulic motor, at least one variable displacement pump configured to supply the at least one hydraulic motor with pressurized hydraulic fluid to rotate the swing mechanism, and at least one actuator configured to adjust the displacement of the at least one variable displacement pump comprises the following steps: receiving a first input indicative of a desired displacement of the at least one variable displacement pump; receiving a second input indicative of an actual displacement of the at least one variable displacement pump; and controlling the at least one actuator to adjust the displacement of the at least one variable displacement pump in a first control mode when the actual displacement does not match the desired displacement, and in a second control mode when the actual displacement matches the desired displacement. An exemplary control in accordance with the present disclosure will be described in the following for the embodiment shown in FIG. 2, with reference to FIGS. 3-6.

Figure 5:
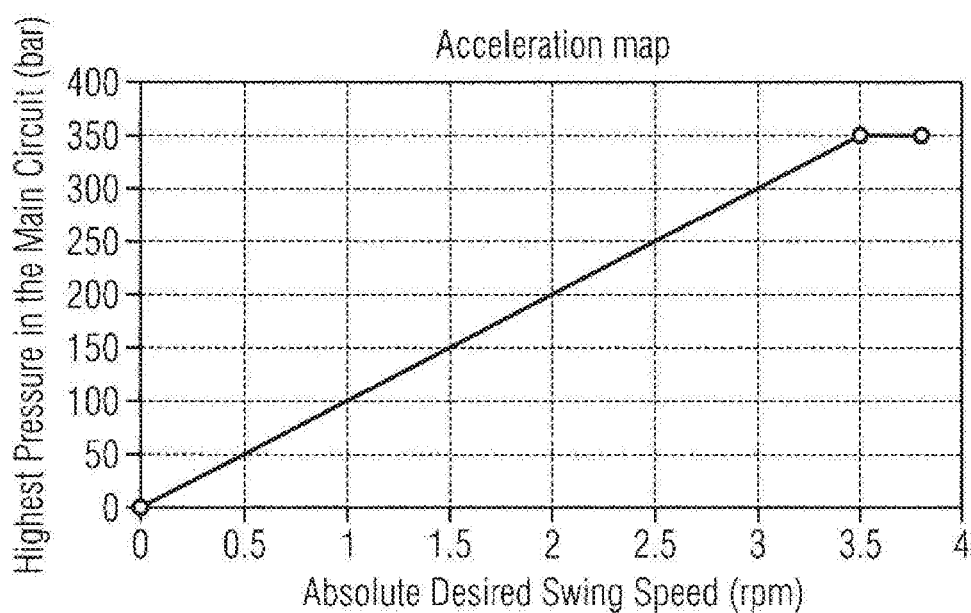
FIG. 5 shows a graph illustrating an acceleration map used in an exemplary control disclosed herein.
Figure 6:
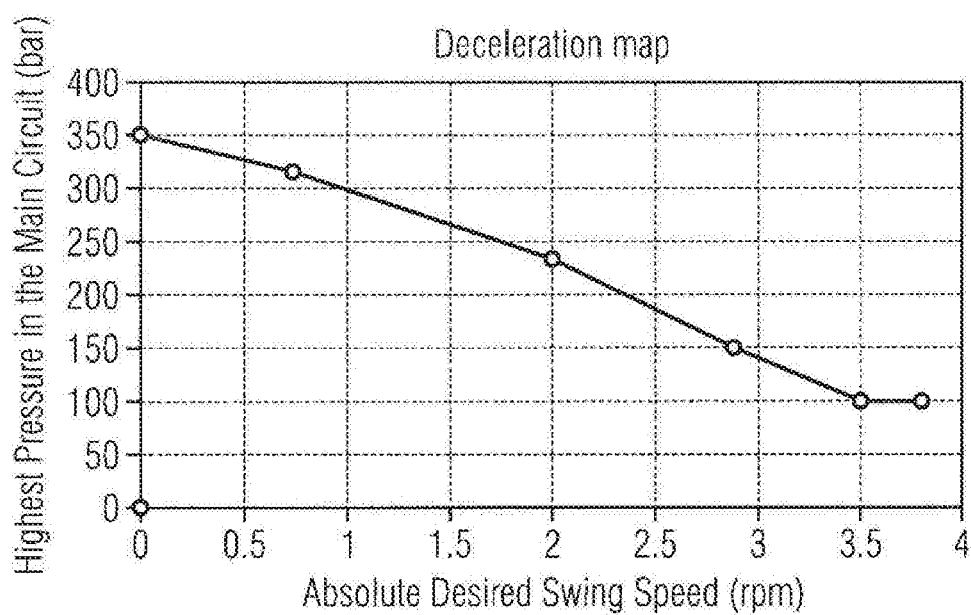
FIG. 6 shows a deceleration map in accordance with an exemplary control disclosed herein.

In accordance with the present disclosure, control unit 114 receives an operator input when an operator of machine 100 operates input device 106. The operator input, for example, the position/operation amount of input device 106, determines a target speed of swing mechanism 105. In other words, the larger the operation amount, the higher the speed at which the operator wishes to rotate swing mechanism 105, i.e. superstructure 103 (see FIG. 1). Here, the target speed also determines a maximum allowable system pressure in closed-loop hydraulic circuit 164. In this respect, as shown in FIGS. 5 and 6, different maximum allowable system pressures can be used in case of acceleration and deceleration of swing mechanism 105. In case of acceleration of swing mechanism 105, the higher the target speed, the higher the maximum allowable system pressure, up to an upper limit value that may be determined by the design of hydraulic control system 116. Likewise, in case of deceleration, the lower the target speed, i.e. the more swing mechanism 105 is decelerated, the higher the maximum allowable system pressure.

Based on the operator input, control unit 114 calculates a desired pump displacement that is required to drive hydraulic motor 130 such that swing mechanism 105 rotates at the target speed. Then, control unit 114 compares the desired pump displacement to the actual pump displacement detected, for example, by pump displacement sensor 154. Based on the result of the comparison, control unit 114 operates in the pressure control mode or the velocity control mode. In particular, while the actual pump displacement is not equal to the desired displacement, for example, has not reached the same, control unit 114 performs the pressure control. On the other hand, once the actual displacement reaches the desired pump displacement and matches the same, control unit 114 switches to the velocity control in order to maintain the desired displacement of variable displacement pump 140, such that swing mechanism 105 rotates at a constant speed.

In accordance with the present disclosure, the pressure control is implemented by modelling a so-called "balance valve" that would normally be provided between pilot valves 144A, 144B and inputs X1 and X2 of hydraulic actuator 142 and receive the system pressures upstream and downstream of variable displacement pump 140 and the pilot pressures generated on the basis of the operation amount of input device 106 by pilot valves 144A, 144B, and limit the respective pilot pressures based on the detected system pressures and the maximum allowable system pressure. In accordance with the present disclosure, this balance valve is now modelled in software, i.e., control unit 114 receives the different pressures detected by pressure sensors 152, 153, 156, 157, calculates the pilot pressure that would be supplied to hydraulic actuator 142 via the balance valve, and controls pilot valves 144A, 144B such that the calculated pilot pressure is supplied to hydraulic actuator 142 via inputs X1, X2. Accordingly, control unit 114 is configured to limit the pilot pressure that would normally be supplied to hydraulic actuator 142, based on the detected pressures and the maximum allowable system pressure. Here, an appropriate model for the balance valve can be determined in advance to result in the desired behavior/limitation of the pilot pressures for the different maximum allowable system pressures. In this manner, a pressure based control is obtained while swing mechanism 105 is accelerated/decelerated, while a velocity based control is obtained when swing mechanism 105 is coasting or has been stopped.

Figure 3:
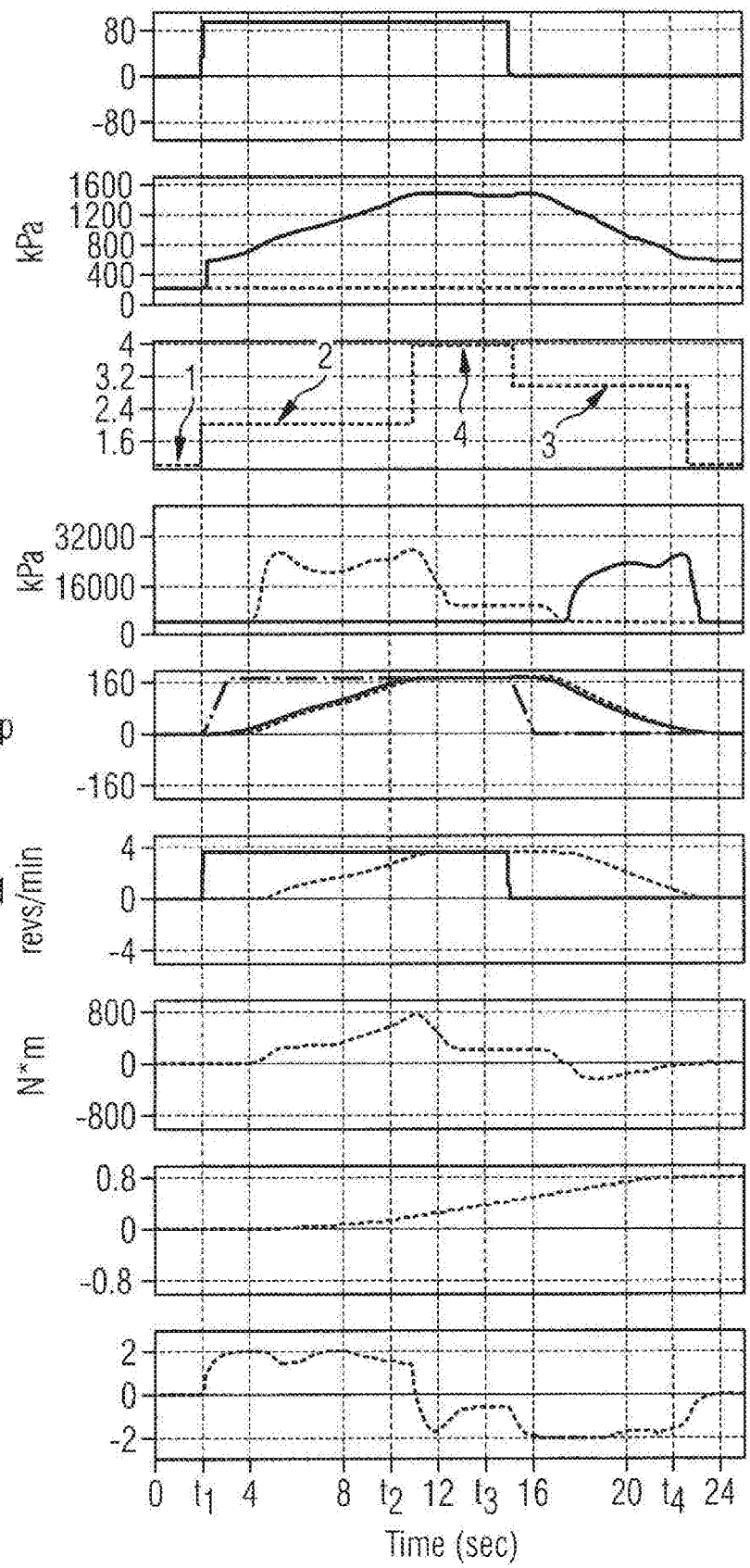
FIG. 3 shows a plurality of graphs illustrating an exemplary operation of the hydraulic control system in accordance with an exemplary embodiment of the present disclosure.

An exemplary operation in case swing mechanism 105 is accelerated from the stopped stated in order to rotate at a target speed desired by the operator of machine 100 is described in the following with reference to FIG. 3. In FIG. 3, the top graph shows the input by the operator, in other words, the operation amount of input device 106. The second graph shows the pilot pressure supplied to hydraulic actuator 142 via ports X1 and X2. The third graph shows the mode in which control unit 114 is operating. Here, "1" designates the velocity control in the stopped state of swing mechanism 105, "2" designates the pressure control during acceleration of swing mechanism 105, "4" designates the velocity control while swing mechanism 105 is coasting with constant speed, and "3" designates the pressure control during deceleration of swing mechanism 105.

The fourth graph in FIG. 3 shows the system pressure in closed-loop hydraulic circuit 164 at ports A and B (see FIG. 2), via which the hydraulic fluid contained in closed-loop hydraulic circuit 164 is supplied to hydraulic motor 130.

The fifth graph shows the actual displacement of variable displacement pump 140 as detected by pump displacement sensor 154, the desired displacement in accordance with the operation amount of input device 106, and the commanded displacement that is determined by control unit 114 and used by the same to control pilot valves 144A, 144B in such a manner that the system pressure in closed-loop hydraulic circuit 164 does not exceed the maximum allowable system pressure.

The sixth graph in FIG. 3 shows the actual swing speed of swing mechanism 105 and the commanded swing speed that corresponds to the operation amount of input device 106.

The seventh graph shows the pump torque, the eighth graph shows the displacement of swing mechanism 105, and the ninth graph shows the simulated behavior of the "balance valve" that is modelled in software, which results in the limitation of the pilot pressure by the appropriate control of control unit 114 in order to maintain the system pressure below the maximum allowable system pressure.

As shown in FIG. 3, at $t_1$, the operator operates input device 106 to rotate swing mechanism 105 at a desired target speed. Accordingly, the desired displacement increases in accordance with the operation amount of input device 106, to a desired displacement that results in the rotation of swing mechanism 105 at the target speed. This is also in accordance with the commanded swing speed of swing mechanism 105, as shown in FIG. 3. Accordingly, pilot valve 144B is controlled by control unit 114 to supply pressurized fluid to hydraulic actuator 142 via input X2 in order to adjust the displacement of variable displacement pump 140 such that hydraulic motor 130 is driven to accelerate swing mechanism 105. Therefore, control unit 114 switches from control mode 1 to control mode 2 at $t_1$.

However, based on the software model that is used by control unit 114, the actual command that is sent to pilot valve 144B does not directly correspond to the desired displacement of variable displacement pump 140, but is reduced on the basis of the maximum allowable system pressure that is determined from the model. For example, control unit 114 uses the acceleration map shown in FIG. 5 in order to determine the maxinum allowable system pressure, and limits the displacement that is commanded accordingly. In this manner, as shown in FIG. 3, the pressure supplied to hydraulic actuator 142 ramps up in a controlled manner, and does not directly follow the desired displacement/target speed indicated by input device 106.

In this manner, at time $t_2$, the swing speed of swing mechanism 105, which closely follows the commanded/actual displacement of variable displacement pump 140, reaches the target speed set by the operator of machine 100. At this point, control unit 114 switches from pressure control mode 2 to velocity control mode 4 in order to maintain the desired displacement of hydraulic pump 140, and therefore the target speed set by the operator. In this state, swing mechanism 105 rotates at essentially constant speed, in accordance with the operator request. Here, the mode switching may be performed on the basis of a comparison between the actual displacement of variable displacement pump 140 and the desired displacement in the above-described manner.

At time $t_1$, the operator returns input device 106 to neutral. This means that the operator desires to stop swing mechanism 105, such that it no longer rotates in the desired direction. Accordingly, the desired displacement is reduced to zero, and the actual displacement of hydraulic pump 140 no longer matches the desired displacement. In response to this, control unit 114 switches from velocity control mode 2 to pressure control mode 4 to decelerate swing mechanism 105. Here, the maximum allowable system pressure is again set based on the deceleration map shown in FIG. 6 in order to perform the pressure control in the above-described manner. The result is that the commanded displacement is not the desired displacement, but is decreased more slowly to the desired displacement based on the modelled behavior of the balance valve in accordance with the maximum allowable system pressure. As a result, swing mechanism 105 is decelerated in a controlled manner under the control of control unit 114. As shown in FIG. 3, the swing speed of swing mechanism 105 closely follows the commanded/actual displacement of variable displacement pump 140.

At time $t_4$, the actual displacement reaches the desired displacement, and control unit 114 switches from the pressure control mode 3 to the velocity control mode 1, i.e. the control during the stop of swing mechanism 105.

Figure 4:
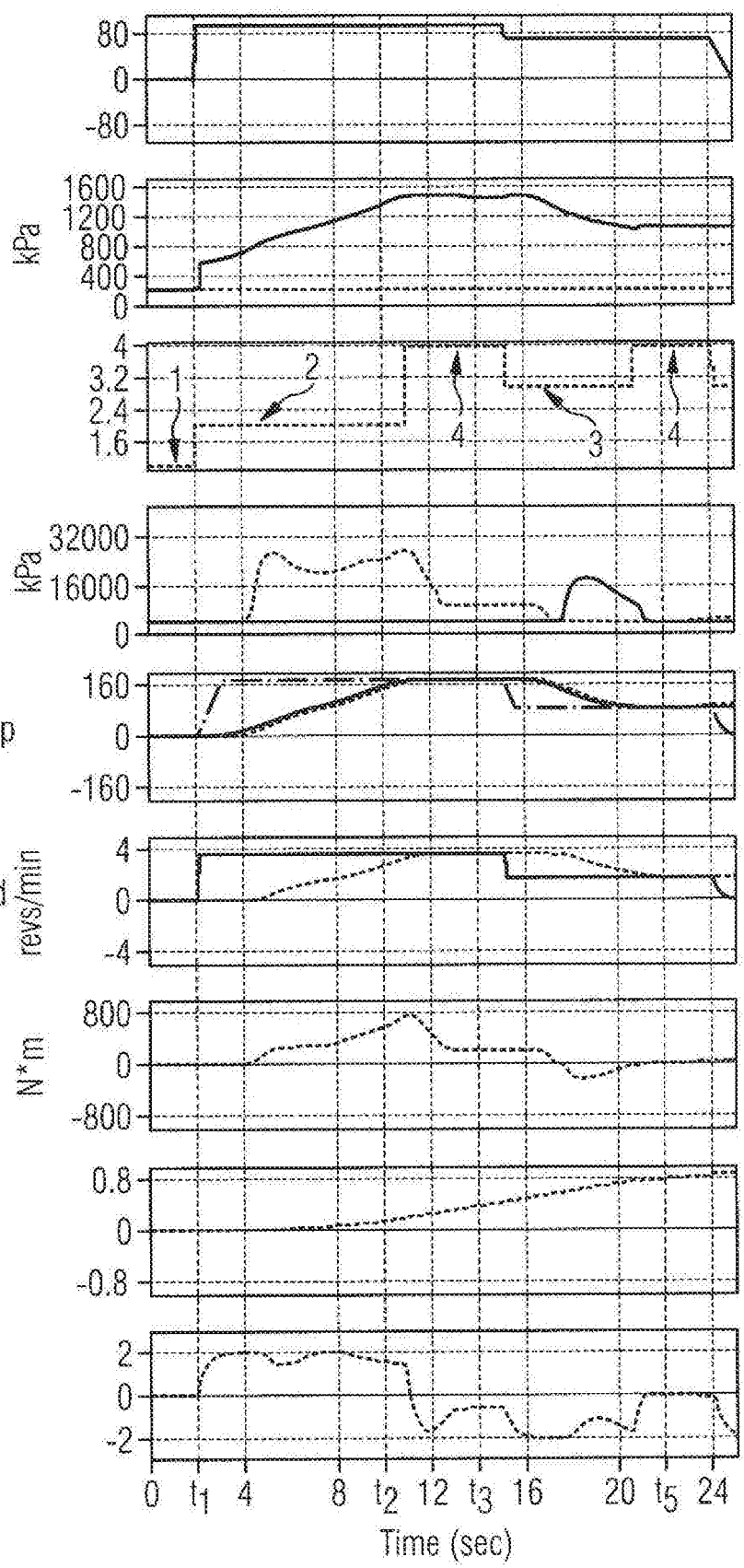
FIG. 4 shows a plurality of graphs illustrating another exemplary operation of the hydraulic control system.

It will be readily appreciated that many different operations of input device 106 by the operator of machine 100 are conceivable. However, according to the present disclosure, control unit 114 will always switch between the above-mentioned four control modes based on whether it is determined that an acceleration/deceleration or coasting/stop should be performed. One further example for this control is shown in FIG. 4. In FIG. 4, the operator again moves the input device 106 in a desired direction in accordance with the desired rotation speed at time $t_1$, but then only slightly reduces the operation amount of input device 106 to slow down swing mechanism 105.

As shown in FIG. 4, the control is the same as in FIG. 3 until time $t_3$. However, at time $t_3$, the reduction of the desired displacement is less than in the example shown in FIG. 3. Therefore, while control unit 114 again switches to control mode 3, at time $t_5$, control unit 114 again switches to control mode 4 after the newly set target speed of swing mechanism 105 has been reached. It can also be seen in FIG. 4 that the system pressure is maintained at a lower maximum allowable system pressure, in accordance with the deceleration map shown in FIG. 6.

What is also shown in FIGS. 3 and 4 is that, during the deceleration of swing mechanism 105, the torque of variable displacement pump 140 becomes negative. Therefore, whenever swing mechanism 105 is decelerated, the deceleration energy is transferred to a power take-off shaft 141 of variable displacement pump 140 (see FIG. 2). In this manner, the deceleration energy can be recuperated and used by other systems of machine 100 if needed.

In accordance with the above-described hydraulic control system and method, a mixed mode control strategy for a closed-loop swing system of a machine such as a large hydraulic excavator can be achieved. During acceleration and deceleration, a torque rate/pressure control is used, and during coasting and stopping, a velocity control is used. This makes safety states easier to handle, and simplifies the layout of the hydraulic control system, in particular, due to using a software model for the pressure control during acceleration and deceleration in the above-described manner.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the scope of disclosure more generally. All methods described herein may perform in any suitable order unless otherwise indicated herein or clearly contradicted by context.

Accordingly, this disclosure includes all modifications and equivalences of the subject-matter recited in the claims appended hereto as permitted by applicable law. Moreover, any combination of the above-described elements in all possible variations thereof is encompassed by the disclosure unless otherwise indicated herein or clearly contradicted by context.

Although the preferred embodiments of this disclosure have been described herein, improvements and modifications may be incorporated without departing from the scope of the following claims.

The invention claimed is:

1. A hydraulic control system for a machine, comprising:
   a closed-loop hydraulic circuit including a hydraulic motor and at least one variable displacement pump configured to supply the at least one hydraulic motor with pressurized hydraulic fluid;
   at least one actuator configured to adjust the displacement of the at least one variable displacement pump; and
   a control unit configured to:
      receive a first input indicative of a desired displacement of the at least one variable displacement pump;
      receive a second input indicative of an actual displacement of the at least one variable displacement pump; and
      control the at least one actuator to adjust the displacement of the at least one variable displacement pump in a first control mode when the actual displacement does not match the desired displacement, and in a second control mode when the actual displacement matches the desired displacement,
      wherein the second control mode is a velocity control mode in which the control unit controls the at least one actuator such that the displacement of the at least one variable displacement pump is maintained at the desired displacement to rotate the at least one hydraulic motor with substantially constant speed.

2. The hydraulic control system of claim 1, wherein the at least one actuator includes at least one hydraulic actuator, the hydraulic control system further comprising:
   a pilot valve assembly configured to supply the at least one hydraulic actuator with hydraulic fluid in accordance with a command from the control unit.

3. The hydraulic control system of claim 2, wherein the pilot valve assembly includes a first pilot valve configured to supply pressurized fluid to a first input of the at least one hydraulic actuator and a second pilot valve configured to supply pressurized fluid to a second input of the at least one hydraulic actuator under the control of the control unit.

4. The hydraulic control system of claim 3, further comprising:
   a pilot supply pressure sensor configured to detect a pressure of the pilot fluid that is supplied to the first pilot valve and the second pilot valve;
   a pair of pilot pressure sensors configured to detect the pressure of the fluid supplied to the first input and the second input; and
   a pair of system pressure sensors configured to detect the system pressure in the closed-loop hydraulic circuit upstream and downstream of the at least one variable displacement pump, wherein the control unit is configured to control the pilot valves based at least in part on detection results from one or more of the pilot supply pressure sensor, the pair of pilot pressure sensors, and the pair of system pressure sensors.

5. The hydraulic control system of claim 1, further comprising:
an input device configured to receive an operator input corresponding to a desired speed and direction of rotation of a swing mechanism of the machine,
wherein the control unit is operatively coupled to the input device and configured to determine the desired displacement of the at least one variable displacement pump based at least in part on the desired speed and direction of rotation.

6. The hydraulic control system of claim 5, wherein the first control mode is a pressure control mode in which the control unit controls the at least one actuator such that a system pressure in the closed-loop hydraulic circuit does not exceed a maximum desired system pressure set at least in part on the basis of the absolute value of the desired speed of the swing mechanism.

7. The hydraulic control system of claim 6, further comprising a first map, stored in a memory associated with the control unit, relating the maximum desired system pressure to the absolute value of the desired speed of the swing mechanism in case the swing mechanism is accelerated, and
a second map, stored in the memory associated with the control unit, relating the maximum desired system pressure to the absolute value of the desired speed of the swing mechanism in case the swing mechanism is decelerated.

8. The hydraulic control system of claim 5, wherein the first control mode includes an acceleration mode, in which the swing mechanism is accelerated, and a deceleration mode, in which the swing mechanism is decelerated, and
wherein the second control mode includes a stop mode, in which the swing mechanism is stopped, and a coast mode, in which the swing mechanism rotates at constant speed.

9. The hydraulic control system of claim 1, wherein the control unit is configured to switch from the first control mode to the second control mode when the difference between the actual displacement and the desired displacement becomes less than a predetermined threshold, and wherein the predetermined threshold corresponds to value from 1% to 10% of the desired displacement.

10. A machine comprising:
an engine; and
the hydraulic control system according to claim 1,
wherein the at least one variable displacement pump is configured to be powered by the engine.

11. A method of controlling a swing mechanism of a machine comprising a closed-loop hydraulic circuit including a hydraulic motor, at least one variable displacement pump configured to supply the at least one hydraulic motor with pressurized hydraulic fluid to rotate the swing mechanism, and at least one actuator configured to adjust the displacement of the at least one variable displacement pump, the method comprising:
receiving a first input indicative of a desired displacement of the at least one variable displacement pump;
receiving a second input indicative of an actual displacement of the at least one variable displacement pump; and
controlling the at least one actuator to adjust the displacement of the at least one variable displacement pump in a first control mode when the actual displacement does not match the desired displacement, and in a second control mode when the actual displacement matches the desired displacement,
wherein in the second control mode, controlling the at least one actuator such that the displacement of the at least one variable displacement pump is maintained at the desired displacement to rotate the swing mechanism with substantially constant speed.

12. The method of claim 11, further comprising:
receiving an operator input corresponding to a desired speed and direction of rotation of the swing mechanism; and
determining the desired displacement of the at least one variable displacement pump based at least in part on the desired speed and direction of rotation.

13. The method of claim 12, further comprising:
in the first control mode, controlling the at least one actuator such that a system pressure in the closed-loop hydraulic circuit does not exceed a maximum desired system pressure set at least in part on the basis of the absolute value of the desired speed of the swing mechanism.

14. The hydraulic control system of claim 1, wherein the predetermined threshold corresponds to 5% of the desired displacement.

* * * * *